(12) United States Patent
Kaneko

(10) Patent No.: US 10,883,871 B2
(45) Date of Patent: Jan. 5, 2021

(54) SENSOR UNIT AND MUSICAL INSTRUMENT

(71) Applicant: YAMAHA CORPORATION, Hamamatsu (JP)

(72) Inventor: Masato Kaneko, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 243 days.

(21) Appl. No.: 16/171,924

(22) Filed: Oct. 26, 2018

(65) Prior Publication Data

US 2019/0137330 A1     May 9, 2019

(30) Foreign Application Priority Data

Nov. 6, 2017   (JP) ................................. 2017-213483

(51) Int. Cl.
| | |
|---|---|
| *G01H 11/08* | (2006.01) |
| *G01H 3/14* | (2006.01) |
| *F16B 11/00* | (2006.01) |
| *G10H 3/14* | (2006.01) |

(52) U.S. Cl.
CPC ............ *G01H 11/08* (2013.01); *F16B 11/006* (2013.01); *G10H 3/143* (2013.01); *G10H 2220/561* (2013.01)

(58) Field of Classification Search
CPC ..................................................... G01H 11/08
See application file for complete search history.

(56) References Cited

U.S. PATENT DOCUMENTS

| | | | | |
|---|---|---|---|---|
| 3,538,232 A | * | 11/1970 | Knauert ................. | H04R 17/02 84/731 |
| 4,984,498 A | * | 1/1991 | Fishman ................ | G10D 13/02 84/730 |
| 2005/0150366 A1 | | 7/2005 | Susami | |
| 2018/0197516 A1 | * | 7/2018 | Kakehashi ............... | G10H 1/00 |

(Continued)

FOREIGN PATENT DOCUMENTS

| | | |
|---|---|---|
| EP | 0843709 A1 | 5/1998 |
| EP | 3358319 A1 | 8/2018 |
| GB | 913107 A | 12/1962 |

(Continued)

OTHER PUBLICATIONS

Extended European Search Report issued in European Appln. No. 18203668.1 dated Apr. 2, 2019.

(Continued)

*Primary Examiner* — Herbert K Roberts
(74) *Attorney, Agent, or Firm* — Rossi, Kimms & McDowell LLP

(57) ABSTRACT

A sensor unit is for attaching to a vibrating body. The sensor unit includes: a sheet sensor that has a sheet shape and flexibility. The sheet sensor converts vibration that acts in a thickness direction of the sheet sensor to a voltage and outputting the voltage. The sensor unit further includes a first sticking member that includes a soft base material and two adhesive layers. The soft base material has a sheet shape and stress conformability. The two adhesive layers are respectively provided on both surfaces of the soft base material. The first sticking member is attached to one surface of the sheet sensor.

12 Claims, 2 Drawing Sheets

(56) References Cited

U.S. PATENT DOCUMENTS

2018/0209838 A1    7/2018  Miyata et al.

FOREIGN PATENT DOCUMENTS

| GB | 2515286 A | 12/2014 |
|---|---|---|
| JP | H04142428 A | 5/1992 |
| JP | H05172624 A | 7/1993 |
| JP | H09244633 A | 9/1997 |
| JP | 2010224570 A | 10/2010 |
| JP | 2016033580 A | 3/2016 |
| JP | 2017067763 A | 4/2017 |
| WO | 2015145906 A1 | 10/2015 |
| WO | 2017056819 A1 | 4/2017 |

OTHER PUBLICATIONS

Office Action issued in Japanese Application No. 2017-213483 dated Aug. 27, 2019. English translation provided.

* cited by examiner

SENSOR UNIT AND MUSICAL INSTRUMENT

CROSS-REFERENCE TO RELATED APPLICATION

Priority is claimed on Japanese Patent Application No. 2017-213483, filed Nov. 6, 2017, the content of which is incorporated herein by reference.

BACKGROUND OF THE INVENTION

Field of the Invention

The present invention relates to a sensor unit and a musical instrument.

Description of Related Art

Japanese Unexamined Patent Application, First Publication No. 2017-067763 discloses a constitution in which a piezoelectric element (sheet sensor) including electrode layers on both surfaces of a porous resin film is attached to the surface of a vibrating body of a musical instrument. In this configuration, when the vibrating body of the musical instrument vibrates, a voltage corresponding to the vibration of the vibrating body is output from the piezoelectric element (sheet sensor).

SUMMARY OF THE INVENTION

However, if the sheet sensor is merely adhered to the surface of the vibrating body, a problem arises of the voltage that is output from the sheet sensor being low. One reason why the voltage output of the piezoelectric element is low is considered to be the adhesion strength between the sheet sensor and the vibrating body being insufficient due to irregularities present in the surface of a vibrating body made of wood or the like. As a result, the vibration of the vibrating body is not sufficiently transmitted to the sensor.

The present invention has been made in view of the above circumstances, and an object of the present invention is to provide a sensor unit that can obtain a high voltage output and a musical instrument.

A sensor unit according to a first aspect of the present invention is for attaching to a vibrating body. The sensor unit includes: a sheet sensor that has a sheet shape and flexibility. The sheet sensor converts vibration that acts in a thickness direction of the sheet sensor to a voltage and outputting the voltage. The sensor unit further includes a first sticking member that includes a soft base material and two adhesive layers. The soft base material has a sheet shape and stress conformability. The two adhesive layers are respectively provided on both surfaces of the soft base material. The first sticking member is attached to one surface of the sheet sensor.

A musical instrument according a second aspect of the present invention includes the above sensor unit.

According to an embodiment of the present invention, it is possible to attach a sensor unit to a vibrating body so that a soft base material having stress conformability is interposed between a sheet sensor and the vibrating body. Therefore, the surface of the soft base material facing the vibrating body conforms to irregularities of the surface of the vibrating body, and as a result, it is possible secure sufficient bonding strength between the sensor unit and the vibrating body. Thereby, it is possible to increase the voltage that is output from the sheet sensor.

DETAILED DESCRIPTION OF THE INVENTION

Figure 1:
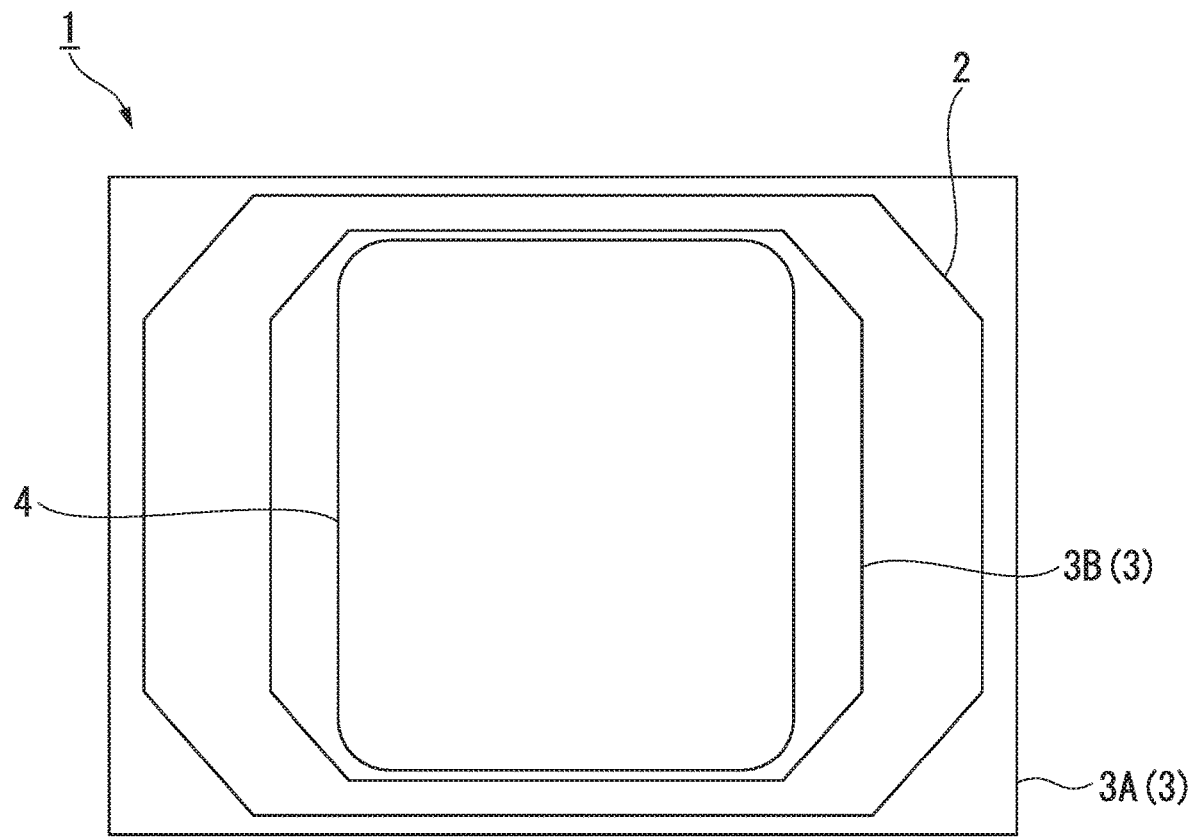
FIG. 1 is a plan view showing a sheet sensor according to an embodiment of the present invention.
Figure 2:
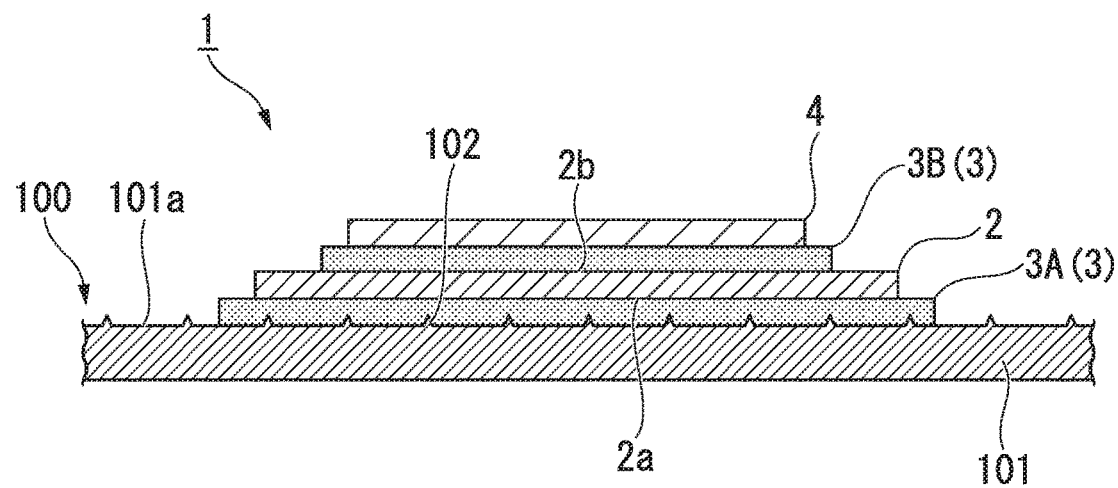
FIG. 2 is a cross-sectional view showing the state of the sheet sensor of FIG. 1 attached to the surface of a vibrating body of a musical instrument.

Hereinbelow, embodiments of the present invention will be described with reference to FIGS. 1 to 4. As shown in FIGS. 1 and 2, a sensor unit 1 according to an embodiment is attached to a vibrating body 101 of a musical instrument 100. The sensor unit 1 includes a sheet sensor 2 and a sticking member 3. The sensor unit 1 of the present embodiment also includes a weight 4.

The sheet sensor 2 is formed in a sheet-like shape sheet having flexibility (that is, having a characteristic of being easily bendable and deformable). The sheet sensor 2 converts vibration (pressure) acting in the thickness direction into voltage and outputs the voltage. There are no particular limitations on the specific configuration of the sheet sensor 2. The sheet sensor 2 may be constituted, for example, by providing an electrode layer on both surfaces of a porous layer formed in a sheet shape or film shape. The porous layer contains numerous pores having a small dimension in the thickness direction. The piezoelectric material used for the porous layer may be polypropylene (PP), polyethylene (PE), polyethylene terephthalate (PET), polyvinyl chloride, a polyolefin-based resin, or a fluorine-based resin or the like.

The shape of the sheet sensor 2 in plan view as seen from the thickness direction of the sheet sensor 2 may be arbitrary, such as a circle. The shape in plan view of the sheet sensor 2 of the present embodiment is an octagonal shape in which the corners of a rectangle are obliquely cut off as shown in FIG. 1. The thickness dimension of the sheet sensor 2 may be arbitrary. The thickness dimension of the sheet sensor 2 in this embodiment is approximately 0.3 mm.

Figure 3:
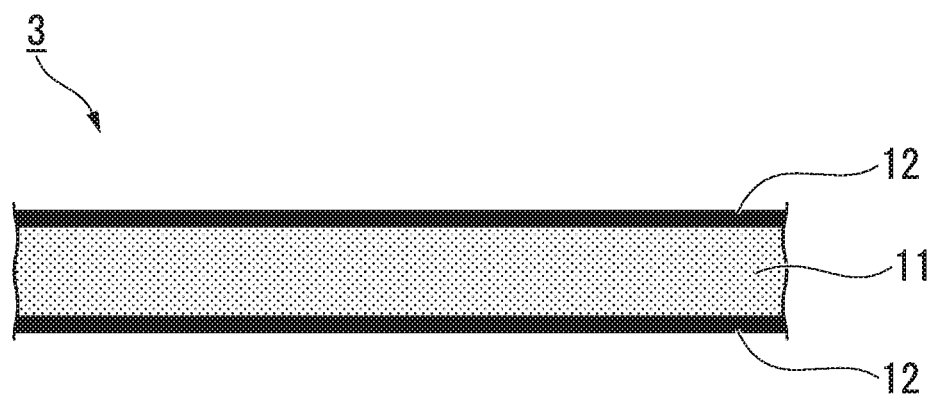
FIG. 3 is a cross-sectional view showing the structure of the sticking member of FIG. 2.

As shown in FIG. 3, the sticking member 3 includes a soft base material 11 formed in a sheet shape and an adhesive layer 12 provided on both surfaces of the soft base material 11.

The soft base material 11 is formed into a sheet shape having stress conformability. Stress conformability of the soft base material 11 includes the property of the surface of the soft base material 11 conforming to the irregular shape of the surface of an object when the soft base material 11 is pressed against the surface of an object such as the vibrating body 101 to be attached thereto. The stress conformability of the soft base material 11 includes a property of efficiently transmitting a force acting on one surface of the soft base material 11 in the thickness direction thereof to the other surface side of the soft base material 11. That is, in the soft base material 11, the force transmission rate in the thickness direction is high. The soft base material 11 has the property of allowing flexural deformation and shear deformation. It is preferable that the soft base material 11 have, for example, a property in which compression deformation in the thickness direction is small.

The soft base material 11 in this embodiment is a foamed plastic. The soft base material 11, which is a foamed plastic, may for example be foamed butyl rubber, polyurethane foam, or polystyrene foam, but in this embodiment is acrylic foam. Compared to foamed butyl rubber, acrylic foam is less prone to compressive deformation in the thickness direction of the soft base material 11. That is, the elastic modulus of acrylic foam in the thickness direction of the soft base material 11 is higher than that of the foamed butyl rubber. The thickness dimension of the soft base material 11 may be arbitrary. The thickness dimension of the soft base material 11 is preferably, for example, 0.6 mm or more and 1.2 mm or less.

The adhesive layer 12 attaches the soft base material 11 to objects such as the sheet sensor 2 and the vibrating body 101 by the adhesive force thereof. The adhesive layer 12 may be constituted with an arbitrary adhesive agent. The adhesive layer 12 of this embodiment is constituted with an acrylic-based adhesive agent.

As shown in FIGS. 1 and 2, the sticking member 3 is attached to surfaces 2a and 2b of the sheet sensor 2 by the adhesive force of the sticking layer 12. The sticking member 3 may be attached to at least one surface 2a of the sheet sensor 2. In the present embodiment, the sticking member 3 is also attached to the other surface 2b of the sheet sensor 2.

The shape and size in plan view of the sticking member 3 as seen in the thickness direction may be the same as the sheet sensor 2, for example, but differ from the sheet sensor 2 in this embodiment. The shape and size of the sticking member 3 in plan view as seen in the thickness direction may be the same for the two sticking members 3, but differ in the present embodiment.

Specifically, the first sticking member 3A to be attached to the one surface 2a of the sheet sensor 2 has a rectangular shape in a plan view. The size of the first sticking member 3A as viewed from the thickness direction is larger than that of the sheet sensor 2. In a state in which the first sticking member 3A is attached to the one surface 2a of the sheet sensor 2, the peripheral edge of the first sticking member 3A is positioned outside the peripheral edge of the sheet sensor 2.

On the other hand, like the sheet sensor 2, the second sticking member 3B attached to the other surface 2b of the sheet sensor 2 has an octagonal shape in plan view in which the corners of a rectangle are obliquely cut off. However, the size of the second sticking member 3B as viewed from the thickness direction is smaller than that of the sheet sensor 2. The peripheral edge of the second sticking member 3B is located inside the peripheral edge of the sheet sensor 2 in a state in which the second sticking member 3B is attached to the other surface 2b of the sheet sensor 2.

The weight 4 is attached to the second sticking member 3B so as to sandwich the second sticking member 3B (one sticking member) between the weight 4 and the sheet sensor 2. The specific gravity and rigidity of the weight 4 are sufficiently larger than those of the sheet sensor 2 and the sticking member 3. The specific gravity of the weight 4 may be, for example, 7 or more. The weight 4 may be made of any metal. The weight 4 may be constituted by, for example, an inexpensive and readily available metal (for example, iron). The weight 4 of the present embodiment is constituted with copper.

The weight 4 may be formed in an arbitrary shape. The surface of the weight 4 to be attached to the second sticking member 3B may be formed flat, for example. In this case, compared with the case in which the surface of the weight 4 to be attached to the second sticking member 3B is curved, the weight of the weight 4 can be made to act on a wider area with respect to the other surface 2b of the sheet sensor 2. In the present embodiment, the weight 4 is formed in a plate shape. The thickness dimension of the weight 4 may be, for example, 0.3 mm or more and 0.5 mm or less.

The shape and size in plan view of the weight 4 as viewed from the thickness direction may be the same as the sheet sensor 2 or the second sticking member 3B, for example, but differ in this embodiment. Specifically, the shape of the weight 4 in plan view is roughly rectangular. Further, the size of the weight 4 when viewed from the thickness direction is smaller than that of the sheet sensor 2 and the second sticking member 3B. In a state in which the weight 4 is attached to the second sticking member 3B, the peripheral edge of the weight 4 is located inside the peripheral edge of the sheet sensor 2 and the second sticking member 3B.

As shown in FIG. 2, the sensor unit 1 of this embodiment configured as described above is attached to a surface 101a of the vibrating body 101 of the musical instrument 100. The vibrating body 101 of the musical instrument 100 is the part of the musical instrument 100 that generates sound by vibrating. The material of the vibrating body 101 of the musical instrument 100 may for example be metal but in the present embodiment is wood. Unevenness as illustrated in FIG. 2 tends to appear on the surface 101a of the vibrating body 101 of the musical instrument 100 made of wood as compared with the case where the vibrating body 101 is made of metal. In FIG. 2, irregularities in the surface 101a of the vibrating body 101 are represented by a plurality of convex portions 102. That is, the surface 101a of the vibrating body 101 of the musical instrument 100 made of wood is often rough. The vibrating body 101 of the musical instrument 100 in the present embodiment is formed in a plate shape. In the vibrating body 101 of the musical instrument 100 formed in a plate shape, sound is usually generated by deformation or vibration including various vibration modes. That is, the vibrating body 101 of the musical instrument 100 usually generates sound by for example vibrating such that a plurality of antinodes (loops) and nodes of standing waves appear in the vibrating body 101.

Figure 4:
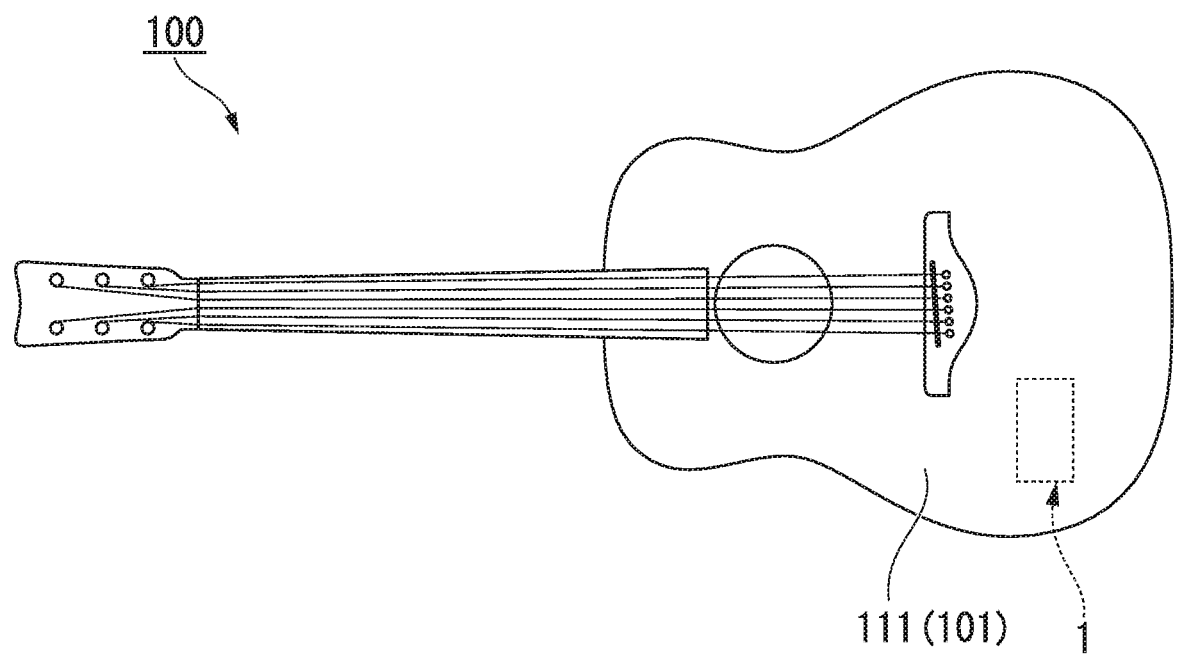
FIG. 4 is a diagram showing an example of a musical instrument including the sheet sensor according to an embodiment of the present invention.

A specific musical instrument 100 in the present embodiment is the acoustic guitar illustrated in FIG. 4. The vibrating body 101 may be, for example, a back plate or a side plate of an acoustic guitar, but in the illustrated example is a front plate 111 of an acoustic guitar. While the sensor unit 1 may be attached to for example the outer surface of the back plate, the side plate or the front plate 111, or the inner surface of the back plate or the side plate, in the illustrated example the sensor unit 1 is attached to the inner surface of the front plate 111 of the acoustic guitar.

As shown in FIG. 2, the sensor unit 1 of the present embodiment is attached to the surface 101a of the vibrating body 101 so as to sandwich the first sticking member 3A with the vibrating body 101. In this state, the first sticking member 3A, the sheet sensor 2, the second sticking member 3B, and the weight 4 are arranged in this order on the surface 101a of the vibrating body 101. In particular, the first sticking member 3A including the soft base material 11 having stress conformability is interposed between the sheet sensor 2 and the surface 101a of the vibrating body 101. Therefore, even if irregularities exist on the surface 101a of the vibrating body 101, the surface of the soft base material 11 of the first sticking member 3A that faces the surface 101a of the vibrating body 101 conforms to the irregularities formed on the surface 101a of the vibrating body 101. Thereby, it is possible to secure sufficient bonding strength between the sensor unit 1 and the vibrating body 101.

When the vibrating body 101 vibrates in the thickness direction of the sensor unit 1 in a state in which the sensor unit 1 of the present embodiment is attached to the surface 101a of the vibrating body 101 as described above, the vibration of the vibrating body 101 is transmitted to the sheet sensor 2 via the first sticking member 3A. Furthermore, the inertia force of the weight 4 acts on the sheet sensor 2 via the second sticking member 3B in accordance with the vibration of the vibrating body 101. As a result, the sheet sensor 2 converts the vibration of the vibrating body 101 including the inertia force of the weight 4 into a voltage and outputs the voltage.

As described above, according to the sensor unit 1 of the present embodiment and the musical instrument 100 including the sensor unit 1, by interposing the sticking member 3 including the soft base material 11 having stress conformability between the sheet sensor 2 and the surface 101a of the vibrating body 101 (for example, the inside surface of the front plate 111), it is possible to secure sufficient bonding strength between the sensor unit 1 and the vibrating body 101. Thereby, it is possible to sufficiently transmit the vibration of the vibrating body 101 to the sheet sensor 2. As a result, it is possible to increase the voltage that is output from the sheet sensor 2.

Further, according to the sensor unit 1 of the present embodiment, the sticking member 3 including the soft base material 11 having stress conformability is interposed between the sheet sensor 2 and the weight 4. Therefore, even when the vibrating body 101 vibrates in various vibrational modes, it is possible to prevent obstruction of this vibration by the weight 4, which has a higher rigidity than the sheet sensor 2 and the vibrating body 101. Thereby, the inertia force of the weight 4 acting on the sheet sensor 2 increases with the vibration of the vibrating body 101, and as a result, the voltage output from the sheet sensor 2 can be further increased.

Further, according to the sensor unit 1 of the present embodiment, the weight 4 is formed in a plate shape. Therefore, by attaching the weight 4 to the sticking member 3 so that the plate thickness direction of the weight 4 coincides with the arrangement direction of the sheet sensor 2, the sticking member 3 and the weight 4, it is possible to suppress the thickness of the sensor unit 1. That is, it is possible to achieve a reduction in the thickness of the sensor unit 1. Further, due to the weight 4 being formed in a plate shape, it is possible to increase the ratio of the surface area of the weight 4 (in particular, the attachment area of the weight 4 to the sticking member 3) to the mass required of the weight 4. Therefore, the voltage output from the sheet sensor 2 (the sensitivity of the sheet sensor 2) can be increased. In addition, it is possible to stably fix the weight 4 to the sheet sensor 2.

Further, in the sensor unit 1 of the present embodiment, the soft base material 11 of the sticking member 3 is foamed plastic. For this reason, the surface of the soft base material 11 of the sticking member 3 facing the vibrating body 101 more suitably conforms to the irregularities of the surface 101a of the vibrating body 101. In addition, it is also possible to more preferably suppress obstruction of the vibration of the vibrating body 101 vibrating in various vibrational modes by the weight 4, which is a rigid body. Therefore, the voltage output from the sheet sensor 2 can be further increased.

Furthermore, in the sensor unit 1 of the present embodiment, the soft base material 11 of the sticking member 3 is made of an acrylic foam, which is a kind of foamed plastic. Acrylic foam has even less compressive deformation in the thickness direction of the soft base material 11 compared to other foamed plastics such as foamed butyl rubber. Therefore, even when the vibrating body 101 vibrates at a high frequency (for example, a frequency in the audible range of 5 kHz or more), the soft base material 11 can transmit the vibration of the vibrating body 101 to the sheet sensor 2 with high efficiency. In addition, the inertia force of the weight 4 according to the vibration of the vibrating body 101 can also be transmitted to the sheet sensor 2 with high efficiency. Accordingly, even when the vibrating body 101 vibrates at a high frequency, it is possible to obtain a high output voltage from the sheet sensor 2. That is, vibration in a wider frequency band in the vibrating body 101 can be obtained with a high output voltage.

In the sensor unit 1 of the present embodiment, when the thickness dimension of the soft base material 11 of the sticking member 3 is 0.6 mm or more, the sticking member 3 can be made to reliably conform to the irregular shape of the surface 101a of the vibrating body 101. In addition, when the thickness dimension of the soft base material 11 is 1.2 mm or less, the compressive deformation of the soft base material 11 in the thickness direction can reliably suppressed to a minimum level. Accordingly, attenuation of the vibration of the vibrating body 101 in the soft base material 11 is favorably suppressed, and so it is possible to reliably transmit the vibration of the vibrating body 101 to the sheet sensor 2.

In addition, in the sensor unit 1 of the present embodiment, the peripheral edge of the first sticking member 3A attached to the one surface 2a of the sheet sensor 2 is located outside the peripheral edge of the sheet sensor 2. As a result, the entire sheet sensor 2 including the peripheral edge part thereof can be securely attached to the surface 101a of the vibrating body 101 by the first sticking member 3A. In addition, in the sensor unit 1 of the present embodiment, the peripheral edge of the second sticking member 3B attached to the other surface 2b of the sheet sensor 2 is located inside the peripheral edge of the sheet sensor 2. This can suitably prevent a part of the second sticking member 3B from protruding to the outside of the peripheral edge of the sheet sensor 2 and adhering to the first sticking member 3A or the vibrating body 101.

In addition, in the sensor unit 1 of the present embodiment, the peripheral edge of the weight 4 attached to the second sticking member 3B is positioned inside the peripheral edge of the sheet sensor 2 and the second sticking member 3B. Thereby, the inertia force and weight of the weight 4 can be effectively applied to the sheet sensor 2.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

The sensor unit of the present invention is not limited to being applied to an acoustic guitar, and can also be applied to any musical instrument having a vibrating body that generates sound at least by vibrating (especially an acoustic musical instrument). The vibrating body of the musical instrument may be, for example, a vibrating plate-shaped body or sheet. The sensor unit of the present invention can be applied to, for example, an acoustic piano having a soundboard as a vibrating body, a drum having a shell as a vibrating body, and the like.

What is claimed is:

1. A sensor unit for attaching to a vibrating body, the sensor unit comprising:
    a sheet sensor that has a sheet shape and flexibility, the sheet sensor being configured to convert vibration that acts in a thickness direction of the sheet sensor to a voltage and output the voltage;
    a first sticking member that comprises a soft base material and two adhesive layers, the soft base material having a sheet shape and stress conformability, the two adhesive layers being respectively provided on both surfaces of the soft base material, and the first sticking member being attached to a first surface of the sheet sensor and to a vibratable surface of the vibrating body such that the first sticking member is sandwiched between the vibrating body and the sheet sensor;
    a second sticking member that is attached to a second surface of the sheet sensor; and
    a weight attached to the second sticking member such that the second sticking member is sandwiched between the weight and the sheet sensor to thereby prevent the weight from obstructing a vibration of the vibratable surface of the vibrating body and increase an inertia force of the weight acting on the sheet sensor so as to increase the voltage output from the sheet sensor,
    wherein a peripheral edge of the weight is positioned inside a peripheral edge of the sheet sensor and inside a peripheral edge of the second sticking member as viewed from a thickness direction of the first sticking member.

2. The sensor unit according to claim 1, wherein the weight has a plate shape.

3. The sensor unit according to claim 1, wherein the soft base material comprises foamed plastic.

4. The sensor unit according to claim 3, wherein the soft base material comprises acrylic foam.

5. The sensor unit according to claim 1, wherein the second sticking member comprises a soft base material and two adhesive layers, the soft base material of the second sticking member having a sheet shape and stress conformability, and the two adhesive layers of the second sticking member being respectively provided on both surfaces of the soft base material of the second sticking member.

6. The sensor unit according to claim 1, wherein the weight comprises a metal.

7. The sensor unit according to claim 1, wherein the weight comprises a metal plate.

8. The sensor unit according to claim 1, wherein a size of the first sticking member as viewed from the thickness direction of the first sticking member is larger than a size of the sheet sensor.

9. The sensor unit according to claim 8, wherein a size of the second sticking member as viewed from the thickness direction of the first sticking member is smaller than the size of the sheet sensor.

10. The sensor unit according to claim 9, wherein the size of the second sticking member as viewed from the thickness direction of the first sticking member is larger than a size of the weight.

11. The sensor unit according to claim 1, wherein a thickness of the soft base material of the first sticking member is in a range of 0.6 mm to 1.2 mm.

12. A musical instrument comprising
    a vibrating body, and
    a sensor unit comprising:
    a sheet sensor that has a sheet shape and flexibility, the sheet sensor being configured to convert vibration that acts in a thickness direction of the sheet sensor to a voltage and output the voltage;
    a first sticking member that comprises a soft base material and two adhesive layers, the soft base material having a sheet shape and stress conformability, the two adhesive layers being respectively provided on both surfaces of the soft base material, and the first sticking member being attached to a first surface of the sheet sensor and a vibratable surface of the vibrating body such that the first sticking member is sandwiched between the vibrating body and the sheet sensor;
    a second sticking member that is attached to a second surface of the sheet sensor; and
    a weight attached to the second sticking member such that the second sticking member is sandwiched between the weight and the sheet sensor to thereby prevent the weight from obstructing a vibration of the vibratable surface of the vibrating body and increase an inertia force of the weight acting on the sheet sensor so as to increase the voltage output from the sheet sensor,
    wherein a peripheral edge of the weight is positioned inside a peripheral edge of the sheet sensor and inside a peripheral edge of the second sticking member as viewed from a thickness direction of the first sticking member.

* * * * *